(12) United States Patent
Watanabe et al.

(10) Patent No.: US 12,001,618 B2
(45) Date of Patent: Jun. 4, 2024

(54) KNOCK-TYPE ELECTRONIC PEN INCLUDING FIRST AND SECOND POSITION INDICATORS LOCATED AT DIFFERENT ENDS OF A TUBULAR CASING

(71) Applicant: Wacom Co., Ltd., Saitama (JP)

(72) Inventors: Daisuke Watanabe, Saitama (JP); Ryoji Kamiyama, Saitama (JP); Masamitsu Ito, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/889,805

(22) Filed: Aug. 17, 2022

(65) Prior Publication Data
US 2022/0413639 A1 Dec. 29, 2022

Related U.S. Application Data

(63) Continuation of application No. PCT/JP2021/012445, filed on Mar. 25, 2021.

(30) Foreign Application Priority Data

Mar. 31, 2020 (JP) ................................. 2020-061713

(51) Int. Cl.
*G06F 3/0354* (2013.01)
*G06F 3/038* (2013.01)
(Continued)

(52) U.S. Cl.
CPC ........ *G06F 3/03546* (2013.01); *G06F 3/0383* (2013.01); *G06F 3/0441* (2019.05); *G06F 3/0442* (2019.05); *G06F 3/046* (2013.01)

(58) Field of Classification Search
None
See application file for complete search history.

(56) References Cited

U.S. PATENT DOCUMENTS

| 2015/0172932 A1* | 6/2015 | Bathiche | G06F 3/0442 710/17 |
| 2016/0154528 A1* | 6/2016 | Ahn | G06F 3/0441 345/174 |

(Continued)

FOREIGN PATENT DOCUMENTS

| CN | 108279812 A | * | 7/2018 | ............... B43K 5/10 |
| JP | 2007249670 A | * | 9/2007 | ......... G06F 3/03545 |

(Continued)

OTHER PUBLICATIONS

International Search Report, mailed Jun. 8, 2021, for International Application No. PCT/JP2021/012445, 4 pages.

*Primary Examiner* — Kirk W Hermann
(74) *Attorney, Agent, or Firm* — Seed IP Law Group LLP

(57) ABSTRACT

A knock-type electronic pen including a tubular casing, a first position indicator such as a written input indicator, a second position indicator such as an eraser, a knock cam mechanism, and a holding mechanism. The knock cam mechanism includes a knock portion including a part protruding outward from an opening at a second end of the tubular casing, and is configured to cause a tip of the first position indicator to protrude from, or be housed within, an opening at a first end of the tubular casing. The holding mechanism, in the state in which the tip of the first position indicator protrudes from the opening at the first end, returns the knock portion pushed into the tubular casing to a state of protruding from the opening at the second end such that at least a tip of the second position indicator protrudes outward.

15 Claims, 5 Drawing Sheets

(51) Int. Cl.
*G06F 3/044* (2006.01)
*G06F 3/046* (2006.01)

(56) References Cited

U.S. PATENT DOCUMENTS

| | | |
|---|---|---|
| 2016/0188008 A1 | 6/2016 | Horie et al. |
| 2017/0097724 A1* | 4/2017 | Kobori .................... G06F 3/046 |
| 2018/0209818 A1* | 7/2018 | Miyazawa .............. G06F 3/046 |
| 2021/0001661 A1* | 1/2021 | Hosoya .................. B43K 29/02 |

FOREIGN PATENT DOCUMENTS

| | | | |
|---|---|---|---|
| JP | 2013-161307 A | 8/2013 | |
| JP | 5959038 B1 | 8/2016 | |
| WO | 2018/216798 A1 | 11/2018 | |
| WO | WO-2018216798 A1 * | 11/2018 | ............. B43K 24/08 |

* cited by examiner

KNOCK-TYPE ELECTRONIC PEN INCLUDING FIRST AND SECOND POSITION INDICATORS LOCATED AT DIFFERENT ENDS OF A TUBULAR CASING

BACKGROUND

Technical Field

The present disclosure relates to a knock-type electronic pen suitably for application, for example, as an electronic pen having an electronic eraser function.

Description of the Related Art

Due to the preference for miniaturization in recent years, there is an increasing demand for miniaturization of portable electronic devices. Further, an electronic pen has come to be used together with a position detection sensor mounted in a small electronic device, and there is a demand for a thinner electronic pen.

Moreover, recently, an electronic pen is regarded as an extension of stationery, and there is a demand for modularization of constituent components of a position indicator disposed inside a pen casing of an electronic pen so that they can be handled interchangeably with a refill (a refill or a cartridge) of a ballpoint pen. In the present disclosure, the term "electronic pen cartridge" is used to refer to a product formed by modularizing and integrating constituent components of a position indicator disposed inside a pen casing of an electronic pen and configured to be replaceable as with a refill of a ballpoint pen.

The applicant has previously proposed a knock-type electronic pen, in which an electronic pen cartridge for the electronic pen can be handled similarly to a refill of a ballpoint pen, and a casing of a stationery knock-type ballpoint pen can be used as a pen casing of the electronic pen as it is (see, for example, Japanese Patent No. 5959038).

BRIEF SUMMARY

There is also an electronic pen having an electronic eraser functional portion, which is used to erase information written in by a position indicator of the electronic pen on a position detection sensor, and which has a configuration similar to that of the position indicator for written input. In this case, the position indicator for written input is disposed on one side in the axial direction of a tubular pen casing, while the position indicator constituting the electronic eraser functional portion is disposed on the other side in the axial direction of the tubular pen casing.

In a case of a knock-type electronic pen, therefore, the position indicator constituting the electronic eraser functional portion may be disposed on the knock portion side.

However, when the position indicator for written input protrudes from an opening at one end of the casing in response to pressing of a knock portion of a knock cam mechanism, the position of the knock portion in the axial direction is not locked (or secured), and the knock portion can move freely in the axial direction. Thus, when the position indicator constituting the electronic eraser functional portion is disposed in the knock portion, the position of the tip of the position indicator constituting the electronic eraser functional portion moves in the axial direction during use. This prevents a stable operation, causing inconvenience to the user.

Therefore, it is desirable to provide a knock-type electronic pen capable of solving the problems that arise when the position indicator is disposed not only on the pen tip side of the pen casing but also on the rear end side opposite to the pen tip side.

To solve the problems described above, there is provided a knock-type electronic pen including a tubular casing, a first position indicator disposed such that a tip of the first position indicator for position indication is located on a side of an opening at one end in an axial direction of the tubular casing, a second position indicator disposed such that a tip of the second position indicator for position indication is located on a side of an opening at another end in the axial direction of the tubular casing, a knock cam mechanism which includes a knock portion including a part protruding outward from the opening at the other end in the axial direction of the tubular casing and which alternately produces, in response to a knock operation on the knock portion, a state in which at least a core rod body at the tip of the first position indicator protrudes from the opening at the one end of the tubular casing and a state in which the first position indicator including the tip of the first position indicator is housed in the tubular casing, wherein the second position indicator is housed in the knock cam mechanism such that at least a core rod body at the tip of the second position indicator is housed in the part of the knock portion protruding outward from the opening at the other end of the tubular casing. The knock-type electronic pen finally includes a holding mechanism which, in the state in which at least the core rod body of the first position indicator protrudes from the opening at the one end of the tubular casing by the knock operation on the knock portion, returns the knock portion pushed into the tubular casing by the knock operation to a state of protruding outward from the opening at the other end in the axial direction of the tubular casing and holds the knock portion in the protruding state.

In the knock-type electronic pen having the configuration described above, the first position indicator is disposed such that the tip of the first position indicator for position indication is located on the side of the opening at the one end in the axial direction of the tubular casing. Further, the knock-type electronic pen is configured to alternately produce, in response to the knock operation on the knock portion of the knock cam mechanism, a state in which at least the core rod body at the tip of the first position indicator protrudes from the opening at the one end of the tubular casing and a state in which the first position indicator including the tip of the first position indicator is housed in the tubular casing.

Further, the second position indicator is housed in the knock cam mechanism such that at least the core rod body at the tip of the second position indicator is housed in the part of the knock portion protruding outward from the opening at the other end of the tubular casing. The second position indicator is, therefore, disposed such that the tip of the second position indicator for position indication is located on the side of the opening at the other end in the axial direction of the tubular casing.

The knock-type electronic pen having the configuration described above includes the holding mechanism which, in a state in which at least the core rod body of the first position indicator protrudes from the opening at the one end of the tubular casing by the knock operation on the knock portion, returns the knock portion pushed into the tubular casing by the knock operation to a state of protruding outward from the opening at the other end in the axial direction of the tubular casing and holds the knock portion in the protruding state.

According to the knock-type electronic pen having the configuration described above, in a state in which the tip of the first position indicator protrudes from the opening at the one end in the axial direction of the tubular casing by the knock cam mechanism, the knock portion of the knock cam mechanism is also held in a state of protruding from the opening at the other end in the axial direction of the tubular casing by the holding mechanism. For example, assume that an electronic eraser functional portion is provided as the second position indicator. In this case, to erase the written information input by the first position indicator whose tip protrudes from the one end in the axial direction of the tubular casing, the user can hold the casing upside down and operate the tip of the second position indicator on the position detection sensor. User operability is improved because the position of the tip of the second position indicator in the axial direction is held by the holding mechanism.

DETAILED DESCRIPTION

Figure 1A:
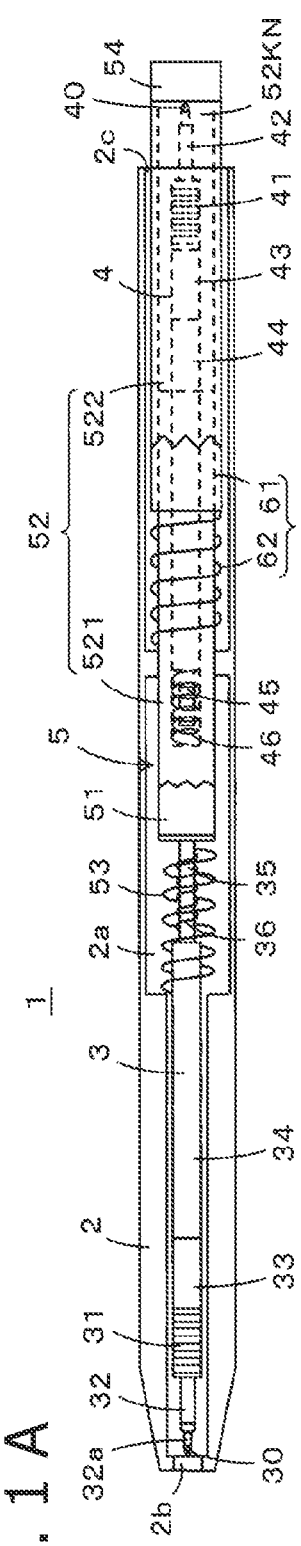
FIGS. 1A to 1D are views for describing an example of a configuration of a knock-type electronic pen according to an embodiment of the present disclosure.

Hereinafter, a knock-type electronic pen according to an embodiment of the present disclosure will be described with reference to the drawings. The electronic pen according to the present embodiment has a configuration in which an electronic pen cartridge of an electromagnetic induction type having a cartridge-type configuration is detachably housed in a tubular casing (hereinafter referred to as a pen casing) of the electronic pen.

FIGS. 1A to 1D are views illustrating an example of a configuration of a knock-type electronic pen according to an embodiment of the present disclosure. In the example of FIGS. 1A to 1D, a pen casing 2 of a knock-type electronic pen 1 is made of a transparent synthetic resin, and the inside thereof is depicted as see-through.

In the knock-type electronic pen 1 according to the present embodiment, inside a hollow portion 2a of the pen casing 2 having a tubular, in this example, cylindrical shape, there are housed an electronic pen cartridge 3 for written input, which is an example of a first position indicator, and an electronic pen cartridge 4, which is an example of a second position indicator and constitutes an electronic eraser functional portion.

Figure 2A:
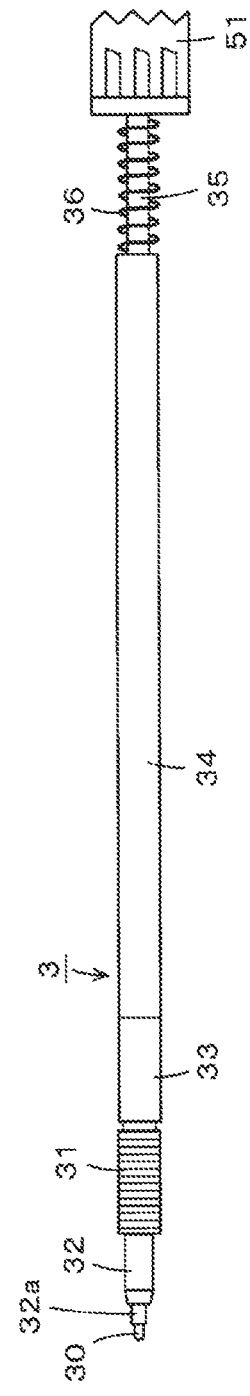
FIGS. 2A and 2B are views for describing an example of a configuration of a position indicator used in the knock-type electronic pen according to the embodiment of the present disclosure.
Figure 2B:
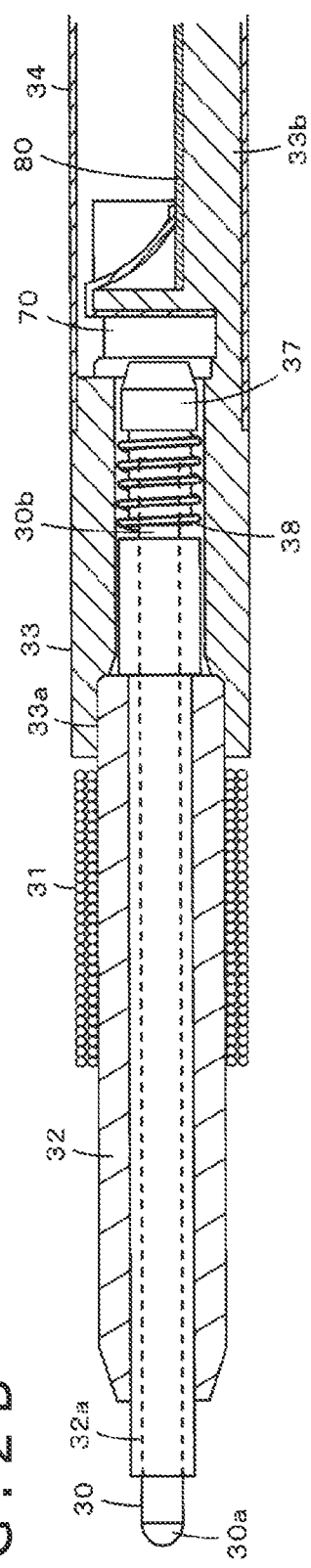

FIGS. 2A and 2B are views illustrating an example of a configuration of the electronic pen cartridge 3 for written input. In the present embodiment, the electronic pen cartridge 4 constituting the electronic eraser functional portion has substantially the same configuration as that of the electronic pen cartridge 3 for written input. Therefore, an example of the configuration of the electronic pen cartridge 3 for written input is described herein, and the description of an example of the configuration of the electronic pen cartridge 4 constituting the electronic eraser functional portion is omitted.

FIG. 2A is a view illustrating an overall appearance of the electronic pen cartridge 3 for written input. FIG. 2B is an enlarged sectional view of the pen tip side of the electronic pen cartridge 3 for written input.

As illustrated in FIGS. 2A and 2B, the electronic pen cartridge 3 according to the present embodiment includes a core rod body 30, a magnetic core, in this example, a ferrite core 32 around which a coil 31 is wound, a holder 33, a cartridge casing 34, and a rear end member 35. The holder 33 holds a pen pressure detector 70 and a circuit board 80 (see FIG. 2B). The cartridge casing 34 houses and protects the pen pressure detector 70 and the circuit board 80, which are held by the holder 33. The rear end member 35 is coupled to the side opposite to the core rod body 30 side of the cartridge casing 34.

In this example, the core rod body 30 is a thin rod-shaped member made of a relatively hard and elastic resin material, for example, polyoxymethylene (POM). In this example, as illustrated in FIG. 2B, the core rod body 30 is inserted into a core pipe member 32a fitted and fixed to a through-hole of the ferrite core 32, and a side 30b of the core rod body 30 opposite to a pen tip side 30a of the core rod body 30 is configured to transmit a pen pressure to the pen pressure detector 70, which is disposed in the holder 33, via a pressure transmission member 37. A coil spring 38 is an elastic member for returning the core rod body 30 to its original position when a pen pressure applied to the core rod body 30 disappears.

In the present embodiment, the pen pressure detector 70 is the one in which a variable capacitor is configured by a semiconductor chip including a micro electro mechanical systems (MEMS) element (see, for example, Japanese Patent Laid-Open No. 2013-161307). The pen pressure detector 70 is not limited to the one configured by a semiconductor chip as in this example and may use, instead of a variable capacitor, an element that can change the inductance.

The holder 33 is made of, for example, a resin material. As illustrated in FIG. 2B, the holder 33 includes a tubular portion 33a and a mounting base 33b. The tubular portion 33a holds the pen pressure detector 70 and is fitted to the ferrite core 32. The mounting base 33b serves as a base on which the circuit board 80 is mounted. On the circuit board 80, a capacitor (not illustrated) constituting a resonant circuit together with the coil 31 is mounted.

The cartridge casing 34 includes a pipe-shaped member made of a hard material, in this example, a pipe-shaped member made of metal, and constitutes a circuit portion protecting member that protects electric circuit configuration portions of the pen pressure detector 70 and the circuit board 80.

A coil spring 36 is disposed on the rear end member 35, which is coupled to the side opposite to the core rod body 30 side of the cartridge casing 34 (see FIG. 2A). In the present embodiment, the rear end member 35 also functions as a fitting portion to which a fitting recess portion of a rotor 51 of a knock cam mechanism 5, to be described later, is fitted. The coil spring 36 functions as a shock absorber (impact absorbing member) that absorbs an impact load (impact pressure) and protects the electronic pen cartridge 3 when the impact load is applied to the core rod body 30 of the electronic pen cartridge 3. The coil spring 36, which serves as the shock absorber, is not elastically displaced within a pen pressure detection range in which the pen pressure detector 70 detects a pressure applied to the core rod body 30. Instead, when an impact load (impact pressure) larger than the pen pressure detection range is applied to the core rod body 30, the coil spring 36 is elastically displaced and absorbs the impact. Further, an elastic force of the coil spring 36 is larger than an elastic force of a coil spring 53.

Returning to the description of the electronic pen 1 illustrated in FIGS. 1A to 1D, in the present embodiment, the electronic pen cartridge for written input (hereinafter referred to as a written input cartridge) 3 is disposed in the hollow portion 2a of the pen casing 2 such that the pen tip side including the core rod body 30 is located on the side of an opening 2b at an end (pen tip side) in the axial direction of the pen casing 2. The written input cartridge 3 has a configuration in which the pen tip side including the core rod body 30 of the written input cartridge 3 is moved in and out from the opening 2b of the pen casing 2 by the knock cam mechanism 5.

The knock cam mechanism 5 includes the rotor 51, a rotor drive portion (knock rod) 52, and the coil spring 53. The rotor drive portion 52 rotates and drives the rotor 51 and moves the rotor 51 in the axial direction. The coil spring 53 is an example of an elastic member and urges the rotor 51 toward an opening 2c at another end in the axial direction of the pen casing 2 at all times. The rotor drive portion 52 includes a knock portion 52KN, which protrudes outward from the opening 2c at the other end in the axial direction of the pen casing 2.

Figure 1B:
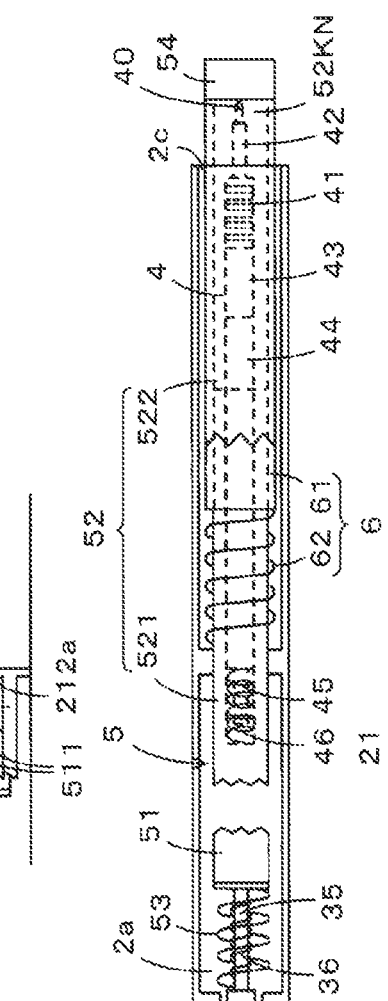
Figure 1C:
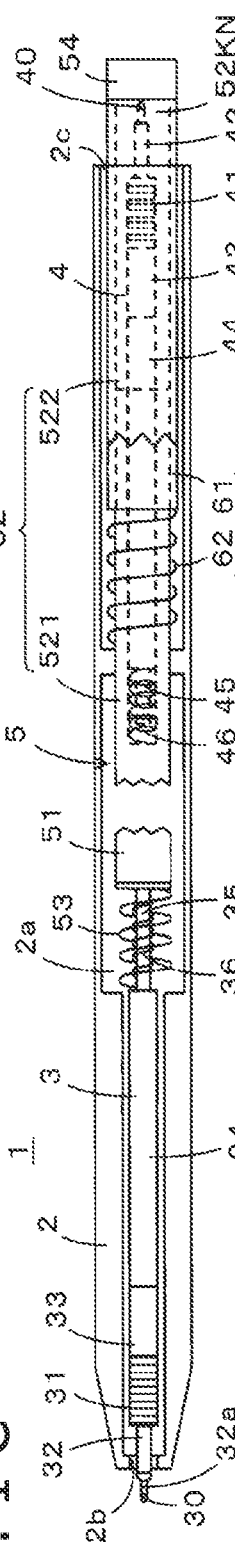

As described above, the rear end member 35 coupled to the side of the cartridge casing 34 opposite to the core rod body 30 side of the cartridge casing 34 is fitted to the fitting recess portion (not illustrated) of the rotor 51, so that the written input cartridge 3 is attached to the electronic pen 1. Then, as illustrated in FIGS. 1A, 1C, and 2A, the coil spring 36, which functions as the shock absorber that protects the written input cartridge 3, is disposed between the rear end portion of the cartridge casing 34 and the rotor 51.

The electronic pen cartridge (hereinafter referred to as an eraser function cartridge) 4 constituting the electronic eraser functional portion is disposed in the rotor drive portion 52 of the knock cam mechanism 5 such that the pen tip side including a core rod body 40 of the eraser function cartridge 4 is located on the side of the opening 2c at the other end (rear end) in the axial direction of the pen casing 2. In the present embodiment, as illustrated in FIGS. 1A and 1C, the eraser function cartridge 4 is housed in the rotor drive portion 52 such that the pen tip of the eraser function cartridge 4 is located in the knock portion 52KN protruding from the opening 2c at the rear end of the pen casing 2.

The eraser function cartridge 4 includes constituent components denoted with reference numerals in the 40s corresponding to the constituent components of the written input cartridge 3. Specifically, the eraser function cartridge 4 includes the core rod body 40, a coil 41, a ferrite core 42, a holder member 43, a cartridge casing 44, a rear end member 45, and a coil spring 46. Further, the eraser function cartridge 4 includes a pen pressure detector 70 and a circuit board 80, similarly to the written input cartridge 3.

In the present embodiment, a holding mechanism 6 is disposed with respect to the rotor drive portion 52. The holding mechanism 6 holds the knock portion 52KN of the rotor drive portion 52 of the knock cam mechanism 5 such that the knock portion 52KN protrudes outward from the opening 2c at the rear end of the pen casing 2. In the present embodiment, the holding mechanism 6 is configured as another knock cam mechanism different from the knock cam mechanism 5. Hereinafter, the knock cam mechanism 5 may be occasionally referred to as a first knock cam mechanism, while the holding mechanism 6 may be occasionally referred to as a second knock cam mechanism. The holding mechanism 6 includes a rotor 61 and a coil spring 62. The coil spring 62 is as an example of an urging member that urges the rotor 61 toward the opening 2c at the rear end of the pen casing 2 at all times. Part of the rotor drive portion 52 of the knock cam mechanism 5 constitutes a rotor drive portion that rotates and drives the rotor 61 and moves the rotor 61 in the axial direction. A detailed configuration of the holding mechanism 6 and a configuration of the knock cam mechanism 5 will be described in detail later.

In the present embodiment, as will be described later, when a pressing force at the time of a knock operation on the knock portion 52KN of the rotor drive portion 52 of the knock cam mechanism 5 is equal to or less than a predetermined value, the holding mechanism 6 holds the knock portion 52KN such that the knock portion 52KN protrudes outward from the opening 2c at the rear end of the pen casing 2. When the pressing force at the time of the knock operation on the knock portion 52KN exceeds the predetermined value, the holding mechanism 6 releases the holding of the knock portion 52KN to allow the knock cam mechanism 5 to start operation in response to the knock operation on the knock portion 52KN.

In this case, in the present embodiment, the predetermined value of the pressing force of the knock operation on the knock portion 52KN of the electronic pen 1 by which holding of the knock portion 52KN by the holding mechanism 6 is released is greater than a user's normal pen pressure applied when the user brings the knock portion 52KN closer to or into contact with a position detection sensor and performs an erasure indication using the eraser function cartridge 4. That is, the value selected here is a value that does not cause the knock cam mechanism 5 to start operation when the user brings the knock portion 52KN of the electronic pen 1 closer to or into contact with the position detection sensor and performs an erasure indication using the eraser function cartridge 4. As will be described later, in the present embodiment, the force corresponding to the predetermined value of the pressing force of the knock operation on the knock portion 52KN by which holding of the knock portion 52KN by the holding mechanism 6 is released is larger than the elastic force of the coil spring 46, which functions as the shock absorber and is disposed on the rear end member 45 of the eraser function cartridge 4.

In this way, in the present embodiment, even when the written input cartridge 3 including the pen tip is housed in the hollow portion 2a of the pen casing 2 or even when the pen tip of the written input cartridge 3 protrudes outward from the opening 2b on the pen tip side of the pen casing 2, the knock portion 52KN of the rotor drive portion 52 of the knock cam mechanism 5 is held in a state of protruding outward from the opening 2c at the rear end of the pen casing 2, and this holding state is maintained as long as a predetermined pressing force acting against the elastic force of the coil spring 46, which functions as the shock absorber and is disposed at the rear end of the eraser function cartridge 4, is not applied to the knock portion 52KN.

Accordingly, as long as the applied pressing force does not exceed the predetermined value, the knock portion 52KN in which the pen tip of the eraser function cartridge 4 is positioned maintains the state of protruding outward from the opening 2c at the rear end of the pen casing 2 regardless of before or after the knock operation. With this configuration, the eraser function cartridge 4 can be used with ease and stability.

In the present embodiment, when the knock operation of pressing the knock portion 52KN of the knock cam mechanism 5 is performed with a pressing force larger than the predetermined value, the rotor drive portion 52 locked and held by the holding mechanism 6 is released, as described later. Therefore, it is possible to alternately produce a state in which the pen tip of the written input cartridge 3 protrudes from the opening 2b on the pen tip side of the pen casing 2 and a state in which the written input cartridge 3 including the pen tip is housed in the hollow portion 2a of the pen casing 2.

Figure 1D:

FIG. 1A illustrates a state in which the entire written input cartridge 3 including the pen tip side is housed in the hollow portion 2a of the pen casing 2. FIG. 1B is a schematic view for describing a state in which the rotor 51 and a first cam main body 21, which is formed on an inner wall surface of the pen casing 2, are engaged with each other at that time. FIG. 1C illustrates a state in which, after the pen tip side of the electronic pen cartridge 3 protrudes from the opening 2b of the pen casing 2 by the knock cam mechanism 5 in response to the above-described knock operation on the knock portion 52KN from the state of FIG. 1A, the pressing force on the knock portion 52KN is removed. FIG. 1D is a schematic view for describing the state in which the rotor 51 and the first cam main body 21, which is formed inside the pen casing 2, are engaged with each other at that time.

As illustrated in FIGS. 1B and 1D, the first cam main body 21 on the inner wall surface of the pen casing 2 includes a plurality of protrusions 211 formed at predetermined intervals in the circumferential direction. In this case, the width of each of the protrusions 211 in the circumferential direction is equal to the interval at which the protrusions 211 are formed. Each of a plurality of recess grooves 212 is formed between adjacent ones of the protrusions 211. Therefore, the first cam main body 21 on the inner wall surface of the pen casing 2 includes the plurality of protrusions 211 and the plurality of recess grooves 212, which are alternately formed.

As illustrated in FIGS. 1B and 1D, a plurality of protrusions 511 are formed on the outer circumferential surface of the rotor 51 of the knock cam mechanism 5 in the circumferential direction. The plurality of protrusions 511 can abut against the protrusions 211 of the first cam main body 21 on the inner wall surface of the pen casing 2 and can be inserted into the recess grooves 212. Further, each of a plurality of recess grooves 512 is formed between adjacent ones of the protrusions 511. Therefore, the rotor 51 includes the plurality of protrusions 511 and the plurality of recess grooves 512, which are alternately formed.

In a state in which the entire written input cartridge 3 including the pen tip side is housed in the hollow portion 2a of the pen casing 2 as illustrated in FIG. 1A, the protrusions 511 of the rotor 51 are in a state of being inserted into the recess grooves 212 of the first cam main body 21 on the inner wall surface of the pen casing 2, as illustrated in FIG. 1B.

From the state of FIG. 1A, when the user performs the knock operation of pressing the knock portion 52KN with a pressing force equal to or greater than the predetermined value, the rotor drive portion 52 moves the rotor 51 toward the opening 2b on the pen tip side of the pen casing 2 in the axial direction in response to the knock operation. At this time, the protrusions 511 of the rotor 51 move along the recess grooves 212 of the first cam main body 21.

Then, after the protrusions 511 of the rotor 51 move to the position where the protrusions 511 are detached from the recess grooves 212 of the first cam main body 21 by the rotor drive portion 52 and then the pressing force on the knock portion 52KN is removed by the user, the rotor 51 is urged to move toward the opening 2c at the rear end of the pen casing 2 by the elastic force of the coil spring 53, and at the same time, the rotor 51 rotates due to the engagement between the rotor drive portion 52 and the rotor 51. Accordingly, as illustrated in FIG. 1D, the protrusions 511 of the rotor 51 abut against the protrusions 211 of the first cam main body 21 and are locked in this state by the elastic force of the coil spring 53.

That is, even when the user removes the pressing force on the knock portion 52KN, the rotor 51 and the first cam main body 21 maintain the state illustrated in FIG. 1D. Due to the locking state in which the protrusions 511 of the rotor 51 abut against the protrusions 211 of the first cam main body 21, the pen tip side of the written input cartridge 3 protrudes from the opening 2b on the pen tip side of the pen casing 2, as illustrated in FIG. 1C.

At this time, as described later, the rotor drive portion 52 of the knock cam mechanism 5 is urged toward the opening 2c at the rear end of the pen casing 2 via the rotor 61 by the coil spring 62 of the holding mechanism 6, and, at the same time, the knock portion 52KN of the rotor drive portion 52 is held in a state of protruding from the opening 2c at the rear end of the pen casing 2 by the operation of the rotor 61 described later. Accordingly, as illustrated in FIG. 1C, the rotor drive portion 52 and the rotor 51 are spatially separated from each other in the axial direction at this time.

From this state, when the user performs the knock operation of pressing the knock portion 52KN with the predetermined value (in this example, a pressing force equal to or greater than the elastic force of the coil spring 46, which functions as the shock absorber and is disposed at the rear end of the eraser function cartridge 4) again, the rotor drive portion 52 held by the holding mechanism 6 is released by the operation of the rotor 61, and the rotor drive portion 52 is movable in the axial direction as described later.

Then, when the rotor drive portion 52 moves in the axial direction by the user's knock operation and the rotor 51 is displaced toward the opening 2b on the pen tip side of the pen casing 2 against the elastic force of the coil spring 53, the rotor 51 rotates by which the protrusions 511 of the rotor 51 are disengaged from the protrusions 211 of the first cam main body 21. After that, when the pressing force on the knock portion 52KN is removed by the user, the protrusions 511 of the rotor 51 are positioned to a location where the protrusions 511 can be inserted into the recess grooves 212 of the first cam main body 21. Then, the rotor 51 moves toward the opening 2c at the rear end of the pen casing 2 by the elastic force of the coil spring 53 and returns to the state of FIG. 1A.

At this time, as described later, the holding mechanism 6 moves in a similar manner to when the holding mechanism 6 shifts from the state of FIG. 1A to the state of FIG. 1C, and the knock portion 52KN of the rotor drive portion 52 returns to the state of protruding from the opening 2c at the rear end of the pen casing 2.

Although not illustrated in FIGS. 1A to 1D, as with a knock cam mechanism of a well-known knock-type ballpoint pen, protrusions are formed on the side circumferential surface of the rotor drive portion 52 on the side where the rotor drive portion 52 is engaged with the rotor 51. The protrusions of the rotor drive portion 52 are configured to be inserted into the recess grooves 212 of the first cam main body 21 of the pen casing 2 to slidingly move therealong. To prevent the rotor drive portion 52 from falling out of the opening 2c at the rear end of the pen casing 2, the protrusions of the rotor drive portion 52 are engaged with end portions 212a (see FIGS. 1B and 1D) at the rear ends of the recess grooves 212 of the first cam main body 21 on the inner wall surface of the pen casing 2.

Description of Holding Mechanism 6

Next, an example of a configuration of the holding mechanism 6 of the knock-type electronic pen 1 according to the present embodiment will be described with reference to FIGS. 3A to 6B.

Figure 3A:
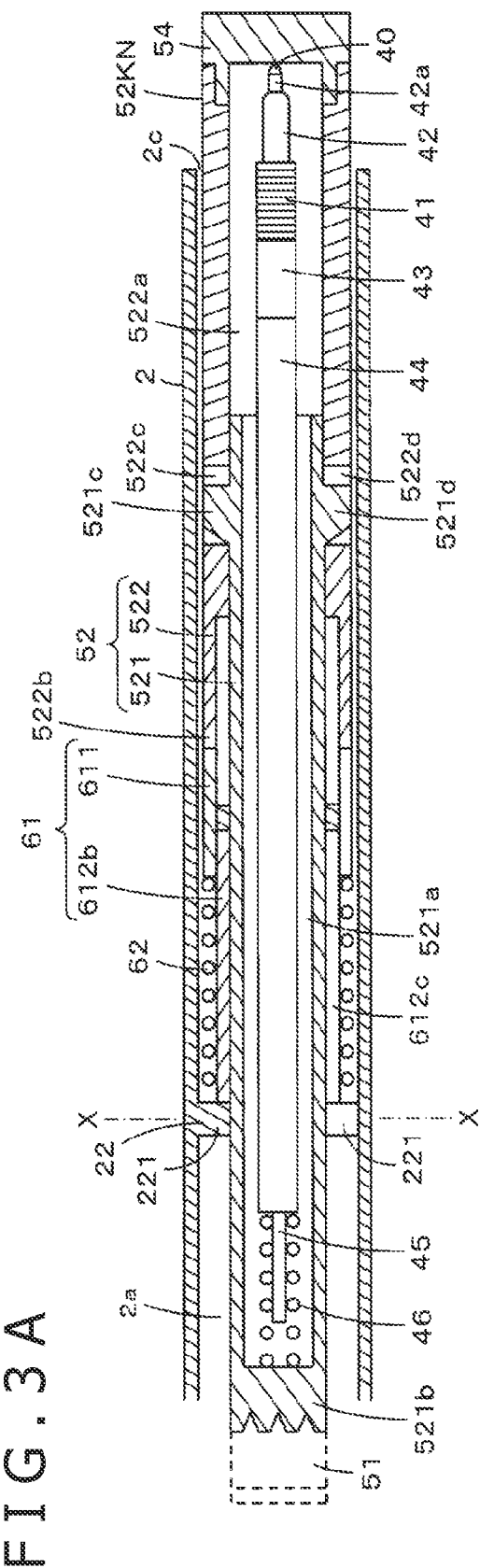
FIGS. 3A and 3B are views for describing an example of a configuration of a holding mechanism of the knock-type electronic pen according to the embodiment of the present disclosure.
Figure 3B:
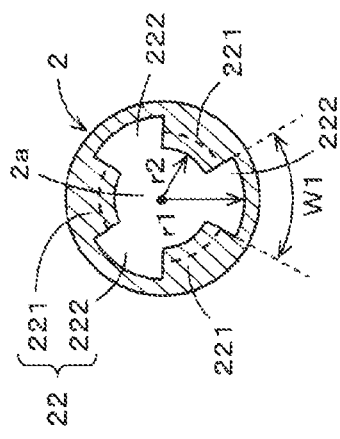

FIG. 3A is a sectional view for describing configurations of the rotor drive portion 52 of the knock cam mechanism 5 and the holding mechanism 6 of the knock-type electronic pen 1 according to the present embodiment. FIG. 3B is a cross-sectional view of the pen casing 2 taken along line X-X of FIG. 3A, illustrating a configuration of a second cam main body 22 described later.

As illustrated in FIGS. 3A, 1A, and 1C, in the present embodiment, the rotor drive portion 52 of the knock cam mechanism 5 is made of resin and includes a first portion 521 and a second portion 522, which are coupled to each other in the axial direction.

In the present embodiment, the first portion 521 has a columnar shape including a recess hole 521a, which houses the rear end side of the eraser function cartridge 4 excluding the pen tip side thereof. The first portion 521 has a recessed and protruding portion on a side 521b (closer to the opening 2b on the pen tip side of the pen casing 2) opposite to the side where the first portion 521 is coupled to the second portion 522. The recessed and protruding portion abuts against the rotor 51 and rotates and drives the rotor 51.

Further, in the present embodiment, the second portion 522 has a cylindrical shape. The inner diameter of the second portion 522 is slightly larger than the outer diameter of the first portion 521 having a columnar shape, while the outer diameter of the second portion 522 is smaller than the inner diameter of the pen casing 2. Further, as illustrated in FIGS. 3A, 1A, and 1C, part of the second portion 522 protruding from the opening 2c at the rear end of the pen casing 2 constitutes the knock portion 52KN.

As illustrated in FIGS. 3A, 1A, and 1C, an opening at the tip of the portion constituting the knock portion 52KN of the second portion 522 is closed by a lid member 54. In the present embodiment, the lid member 54 is, for example, made of an elastic rubber, which serves as a physical eraser. However, instead of an elastic rubber that serves as a physical eraser, the lid member 54 may be made of a member (an elastic member is preferable) that serves as a pseudo eraser.

In the present embodiment, as illustrated in FIG. 3A, protrusions 521c and 521d, which project in the direction orthogonal to the axial direction, are disposed at the respective positions separated by 180 degrees from each other on the outer circumferential side surface on the rear end side of the first portion 521. Further, windows 522c and 522d to which the protrusions 521c and 521d of the first portion 521 are inserted are formed in the second portion 522. In this case, the length of each of the windows 522c and 522d of the second portion 522 in the axial direction is longer than the length of each of the protrusions 521c and 521d of the first portion 521 in the axial direction.

The first portion 521 is inserted from the rear end of the second portion 522, and is coupled to the second portion 522 with the protrusions 521c and 521d inserted into the windows 522c and 522d. In this coupling state, since the length of each of the windows 522c and 522d of the second portion 522 in the axial direction is larger than the length of each of the protrusions 521c and 521d of the first portion 521 in the axial direction, the second portion 522 can move in the axial direction by that amount with respect to the first portion 521.

As illustrated in FIGS. 3A, 1A, and 1C, in a state in which the first portion 521 and the second portion 522 are coupled to each other, the recess hole 521a of the first portion 521 and a hollow portion 522a of the second portion 522 having a cylindrical shape communicate with each other, thereby forming a communication space. This communication space constitutes a hollow portion of the rotor drive portion 52. Further, as illustrated in FIGS. 3A, 1A, and 1C, the eraser function cartridge 4 is housed in the hollow portion of the communication space of the rotor drive portion 52 such that the pen tip side including the core rod body 40 of the eraser function cartridge 4 is positioned in the hollow portion of the knock portion 52KN.

In this case, the coil spring 46, which functions as the shock absorber and is disposed on the rear end member 45 of the eraser function cartridge 4, is located between the bottom of the recess hole 521a of the first portion 521 of the rotor drive portion 52 and the cartridge casing 44 of the eraser function cartridge 4. The tip of the core rod body 40 of the eraser function cartridge 4 is urged to be in contact with the lid member 54 of the knock portion 52KN by the elastic force of the coil spring 46 at all times.

In the present embodiment, the holding mechanism 6 constitutes the second knock cam mechanism by which the knock portion 52KN is held in the state of protruding outward from the opening 2c at the rear end of the pen casing 2, and this holding state is maintained as long as a predetermined pressing force against the elastic force of the coil spring 46, which functions as the shock absorber and is disposed at the rear end of the eraser function cartridge 4, is not applied to the knock portion 52KN.

In this case, the second knock cam mechanism includes the rotor 61, the return coil spring 62, the second cam main body 22, which is formed on the inner wall surface of the pen casing 2, the second portion 522 of the rotor drive portion 52, which constitutes the rotor drive portion that moves the rotor 61 in the axial direction and that rotates and drives the rotor 61, and the coil spring 46.

In the present embodiment, as illustrated in FIGS. 3A, 1A, and 1C, an edge of the second portion 522 of the rotor drive portion 52 on the side where the second portion 522 is coupled to the first portion 521 abuts against the rotor 61 of the holding mechanism 6 and then moves the rotor 61 in the axial direction against the elastic force of the coil spring 62 and rotates the rotor 61.

As illustrated in FIGS. 3A, 1A, and 1C, the second cam main body 22 is formed at the position on the inner wall surface of the pen casing 2 facing the side circumferential surface of the first portion 521 of the rotor drive portion 52. The second cam main body 22 is engaged with the rotor 61 to alternately produce a state in which the rotor 61 is locked in the state of FIGS. 3A, 1A, and 1C and a state in which the rotor 61 can move in the axial direction together with the rotor drive portion 52.

As illustrated in the cross-sectional view of FIG. 3B, the second cam main body 22 includes a plurality of, in this example, three, protrusions 221. The protrusions 221 protrude from the inner circumferential wall surface with a radius r1 into the hollow portion of the pen casing 2 at equal angular intervals in the circumferential direction. Further, the second cam main body 22 includes three recess grooves 222. Each recess groove 222 is formed between adjacent ones of the three protrusions 221. In this example, an angular range width W1 of each recess groove 222 has an angular range width slightly larger than 60 degrees, for example, 63 degrees.

As illustrated in FIG. 3B, the tips of the three protrusions 221 of the second cam main body 22 are formed in such a manner as to be included in the circumference with a radius r2 (<r1) slightly larger than the radius of the outer circumference of the first portion 521 of the rotor drive portion 52. Therefore, the first portion 521 of the rotor drive portion 52 can move in the axial direction without contacting the tips of the three protrusions 221 of the second cam main body 22.

Figure 5:
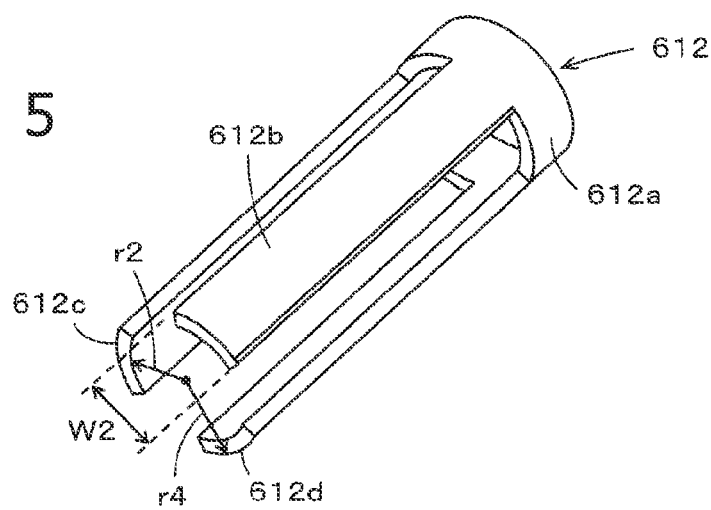
FIG. 5 is a view for describing an example of a configuration of part of the holding mechanism of the knock-type electronic pen according to the embodiment of the present disclosure.
Figure 6A:
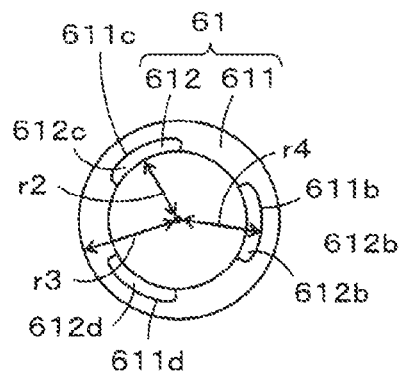
FIGS. 6A and 6B are views for describing an example of a configuration of part of the holding mechanism of the knock-type electronic pen according to the embodiment of the present disclosure.
Figure 6B:
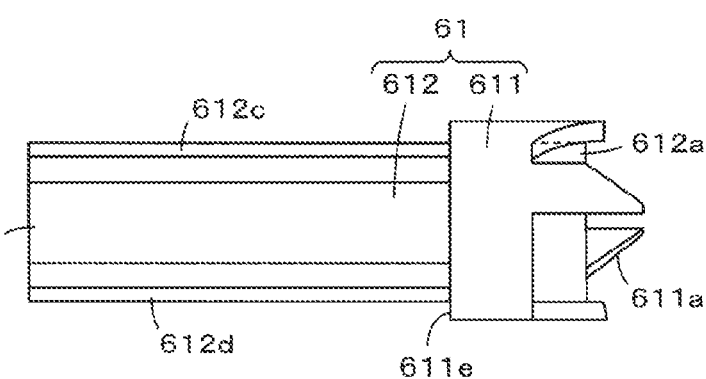

Next, a configuration of the rotor 61 of the second knock cam mechanism according to the present embodiment will be described with reference to FIGS. 4A to 6B. As illustrated in FIGS. 6A and 6B, a ring-shaped member 611 illustrated in FIG. 4A and a leg member 612 illustrated in FIG. 5 are coupled to each other, thereby forming the rotor 61 of the second knock cam mechanism according to the present embodiment as illustrated in FIGS. 6A and 6B.

Figure 4A:
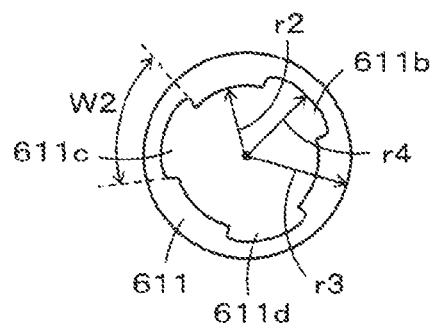
FIGS. 4A and 4B are views for describing an example of a configuration of part of the holding mechanism of the knock-type electronic pen according to the embodiment of the present disclosure.
Figure 4B:
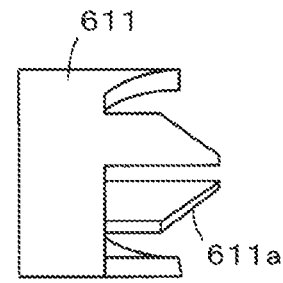

FIG. 4A is a view of the ring-shaped member 611 as viewed from the side opposite to the side where the ring-shaped member 611 is engaged with an end 522b of the second portion 522 of the rotor drive portion 52 in the axial direction. FIG. 4B is a side view of the ring-shaped member 611 as viewed from the direction orthogonal to the axial direction thereof. As illustrated in FIG. 4A, the radius of the inner circumferential wall surface of the ring-shaped member 611 is the radius r2 slightly larger than the radius of the outer circumference of the first portion 521 of the rotor drive portion 52. Further, as illustrated in FIG. 4A, the radius of the outer circumferential side surface of the ring-shaped member 611 is a radius r3 slightly smaller than the radius r1 of the inner circumferential wall surface of the pen casing 2.

As illustrated in FIG. 4A, three recess grooves 611b, 611c, and 611d, each of which has a predetermined angular range width W2, in this example, W2=60 degrees, narrower than the angular range width W1 of the recess grooves 222 of the second cam main body 22, are formed on the inner circumferential wall surface of the ring-shaped member 611 in the axial direction. As illustrated in FIG. 4A, the wall surfaces (bottom surfaces of the recess grooves) of the three recess grooves 611b, 611c, and 611d are formed in such a manner as to be included in the circumference of a radius r4 (r2<r4<r3).

Further, in this example, as illustrated in FIG. 4B, a recessed and protruding portion 611a, which rotates the rotor 61, is formed on the side where the ring-shaped member 611 is engaged with the end 522b of the second portion 522 of the rotor drive portion 52. The recessed and protruding portion 611a is formed in a thickness portion in the range from the radius r4 to the radius r3.

As illustrated in FIG. 5, the leg member 612 has a tubular body in which recess grooves are formed in a slit shape to form three legs 612b, 612c, and 612d each having the angular range width W2. The tubular body of the leg member 612 has an outer circumferential side surface with the radius r4 and an inner circumferential wall surface with the radius r2. In other words, the three legs 612b, 612c, and 612d are formed so as to extend from an end surface of a ring-shaped plate portion 612a in the axial direction.

Then, from the recessed and protruding portion 611a of the ring-shaped member 611 illustrated in FIG. 4B, the three legs 612b, 612c, and 612d of the leg member 612 illustrated in FIG. 5 are inserted into the three recess grooves 611b, 611c and 611d of the ring-shaped member 611, respectively. Accordingly, the rotor 61 illustrated in FIGS. 6A and 6B is formed. FIG. 6A is a view of the rotor 61 as viewed in the axial direction from the side opposite to the recessed and protruding portion 611a of the ring-shaped member 611. FIG. 6B is a side view of the rotor 61 as viewed from the direction orthogonal to the axial direction thereof.

As illustrated in FIGS. 6A and 6B, the rotor 61 has a shape in which the three legs 612b, 612c, and 612d of the leg member 612 protrude on the side opposite to the recessed and protruding portion 611a of the ring-shaped member 611. In this case, as illustrated in FIG. 6B, an outer circumferential edge of the end surface of the ring-shaped member 611 opposite to the recessed and protruding portion 611a of the ring-shaped member 611 serves as a projecting portion 611e, which projects more in the direction orthogonal to the axial direction than the three legs 612b, 612c, and 612d of the leg member 612.

As illustrated in FIGS. 3A, 1A, and 1C, the rotor 61 is attached to the outer circumferential side surface of the first portion 521 of the rotor drive portion 52 such that the first portion 521 of the rotor drive portion 52 is inserted into the hollow portion of the ring-shaped member 611. In this case, the rotor 61 is in a state of being slidable and movable in the axial direction with respect to the first portion 521 of the rotor drive portion 52.

Then, as illustrated in FIG. 3A, the coil spring 62 is disposed between the three protrusions 221 of the second cam main body 22 on the inner wall surface of the pen casing 2 and the projecting portion 611e of the ring-shaped member 611 of the rotor 61. Accordingly, the rotor 61 is urged toward the opening 2c at the rear end of the pen casing 2 by the elastic force of the coil spring 62 at all times, and the recessed and protruding portion 611a side of the rotor 61 and the edge of the second portion 522 of the rotor drive portion 52 are held in a state of being engaged with each other at all times.

Next, an operation of the holding mechanism 6 configured as described above will be described. In a state in which the entire written input cartridge 3 including the pen tip illustrated in FIG. 1A is housed in the hollow portion of the pen casing 2, the tips of the three legs 612b, 612c, and 612d of the rotor 61 abut against the tips of the three protrusions 221 of the second cam main body 22 (the tips of the three protrusions 221 herein are more on the tip side than the positions indicated by dotted lines in FIG. 3B) on the inner wall surface of the pen casing 2. Accordingly, the rotor drive portion 52 of the knock cam mechanism 5 is held such that the knock portion 52KN protrudes from the opening 2c at the rear end of the pen casing 2, and this holding state is maintained as long as the predetermined pressing force against the elastic force of the coil spring 46, which functions as the shock absorber and is disposed at the rear end of the eraser function cartridge 4, is not applied to the knock portion 52KN.

In this state, when the user presses the knock portion 52KN with a pressing force that overcomes the elastic force of the coil spring 46, which functions as the shock absorber, the second portion 522 of the rotor drive portion 52 moves in the axial direction with respect to the first portion 521.

When the second portion 522 of the rotor drive portion 52 moves in the axial direction, the rotor 61 of the holding mechanism 6 rotates, and the three legs 612b, 612c, and 612d of the rotor 61 are inserted into the three recess grooves 222 of the second cam main body 22 on the inner wall surface of the pen casing 2. Accordingly, the holding of the rotor drive portion 52 by the holding mechanism 6 is released. Therefore, the first portion 521 and the second portion 522 of the rotor drive portion 52 integrally move in the axial direction by the user's pressing force on the knock portion 52KN, and the operation of the knock cam mechanism 5 described above starts. Accordingly, the pen tip of the written input cartridge 3 protrudes from the opening 2b on the pen tip side of the pen casing 2.

In this state, when the user stops the knock operation on the knock portion 52KN and removes the pressing force, the rotor 51 of the knock cam mechanism 5 and the first cam main body 21 on the inner wall surface of the pen casing 2 are engaged with each other in the state of FIG. 1D as described above. This keeps the pen tip of the written input cartridge 3 protruding from the opening 2b on the pen tip side of the pen casing 2.

At this time, the coil spring 62 of the holding mechanism 6 elastically urges the second portion 522 of the rotor drive portion 52 toward the opening 2c at the rear end of the pen casing 2, and the protrusions (not illustrated) formed on the side surface of the tip of the first portion 521 of the rotor drive portion 52 move to a position where the protrusions are engaged with the end portions 212a (see FIGS. 1B and 1D) of the recess grooves 212 of the first cam main body 21, as described above. Since the rotor drive portion 52 moves toward the opening 2c at the rear end of the pen casing 2 by the coil spring 62, the three legs 612b, 612c, and 612d of the rotor 61 of the holding mechanism 6 are removed from the recess grooves 222 of the second cam main body 22 on the inner wall surface of the pen casing 2. Then, the rotor 61 of the holding mechanism 6 rotates, and the tips of the three legs 612b, 612c, and 612d of the rotor 61 return to a state of abutting against the tips of the three protrusions 221 of the second cam main body 22 (the tips of the three protrusions 221 herein are more on the tip side than the positions indicated by dotted lines in FIG. 3B) on the inner wall surface of the pen casing 2.

Therefore, as illustrated in FIG. 1C, even in a state in which the pen tip of the written input cartridge 3 protrudes from the opening 2b on the pen tip side of the pen casing 2, the rotor drive portion 52 is held such that the knock portion 52KN protrudes from the opening 2c at the rear end of the pen casing 2, and this holding state is maintained as long as the predetermined pressing force against the elastic force of the coil spring 46, which functions as the shock absorber that protects the eraser function cartridge 4, is not applied to the knock portion 52KN.

From this state, when the user presses the knock portion 52KN again with a pressing force that overcomes the elastic force of the coil spring 46, which functions as the shock absorber, the second portion 522 of the rotor drive portion 52 moves in the axial direction with respect to the first portion 521. Then, as described above, the rotor 61 rotates, and the three legs 612b, 612c, and 612d of the rotor 61 are inserted into the three recess grooves 222 of the second cam main body 22 on the inner wall surface of the pen casing 2. The first portion 521 and the second portion 522 of the rotor drive portion 52 integrally move in the axial direction by the user's pressing force on the knock portion 52KN, and the operation of the knock cam mechanism 5 described above starts.

That is, the rotor 51 in the state of FIG. 1D is disengaged from the protrusions 211 of the first cam main body 21 on the inner wall surface of the pen casing 2, and by the return coil spring 53, the written input cartridge 3 including the pen tip returns to the state of FIG. 1A in which the written input cartridge 3 including the pen tip is housed in the hollow portion 2a of the pen casing 2.

At this time, as in the time when the written input cartridge 3 including the pen tip side is caused to protrude from the opening 2b on the pen tip side, the coil spring 62 of the holding mechanism 6 elastically urges the second portion 522 of the rotor drive portion 52 toward the opening 2c at the rear end of the pen casing 2, and the protrusions (not illustrated) formed on the side surface of the tip of the first portion 521 of the rotor drive portion 52 move to a position where the protrusions are engaged with the end portions 212a (see FIGS. 1B and 1D) of the recess grooves 212 of the first cam main body 21, as described above. Then, since the rotor drive portion 52 moves toward the opening 2c at the rear end of the pen casing 2 by the coil spring 62, the three legs 612b, 612c, and 612d of the rotor 61 of the holding mechanism 6 are removed from the recess grooves 222 of the second cam main body 22 on the inner wall surface of the pen casing 2. Then, the rotor 61 of the holding mechanism 6 rotates, and the tips of the three legs 612b, 612c, and 612d of the rotor 61 return to a state of abutting against the tips of the three protrusions 221 of the second cam main body 22 (the tips of the three protrusions 221 herein are more on the tip side than the positions indicated by dotted lines in FIG. 3B) on the inner wall surface of the pen casing 2.

In this way, as illustrated in FIG. 1A, even in a state in which the written input cartridge 3 including the pen tip is housed in the hollow portion 2a of the pen casing 2, the rotor drive portion 52 is held such that the knock portion 52KN thereof protrudes from the opening 2c at the rear end of the pen casing 2, and this holding state is maintained as long as the predetermined pressing force against the elastic force of the coil spring 46, which functions as the shock absorber that protects the eraser function cartridge 4, is not applied to the knock portion 52KN.

[Position Detection Device Operating in Cooperation with Knock-Type Electronic Pen 1 According to Present Embodiment]

Figure 7:
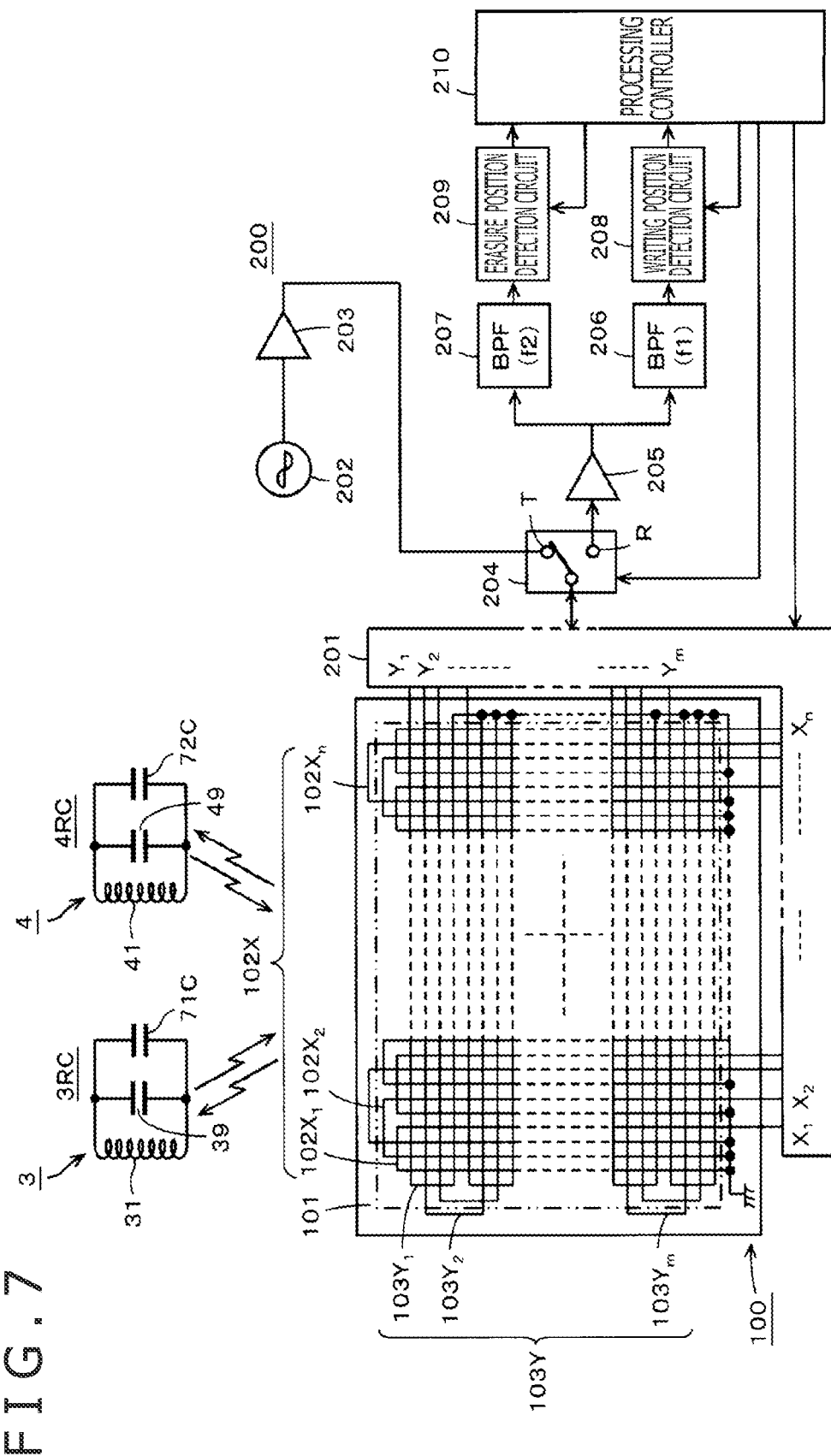
FIG. 7 is a diagram for describing an example of a configuration of a position detection device used together with the knock-type electronic pen according to the embodiment of the present disclosure.

A configuration and operation of a position detection device that operates in cooperation with the knock-type electronic pen 1 according to the present embodiment will be described with reference to FIG. 7.

As described above, the knock-type electronic pen 1 according to the present embodiment includes the written input cartridge 3 and the eraser function cartridge 4 as position indicators. As illustrated in FIG. 7, the written input cartridge 3 includes, as an electronic circuit configuration, a resonant circuit 3RC in which the coil 31, a capacitor 39, and a variable capacitor 71C including the pen pressure detector are connected in parallel to each other. The eraser function cartridge 4 includes a resonant circuit 4RC in which the coil 41, a capacitor 49, and a variable capacitor 72C including the pen pressure detector are connected in parallel to each other. In this case, a resonant frequency f1 of the resonant circuit 3RC is different from a resonant frequency f2 of the resonant circuit 4RC.

The position detection device includes a position detection sensor 100 and a position detection circuit 200. The position detection sensor 100 includes an X-axis direction loop coil group 102X and a Y-axis direction loop coil group 103Y, which are formed on a sensor substrate 101.

The X-axis direction loop coil group 102X includes n loop coils $102X_1$ to $102X_n$ (n is an integer of 2 or more) arranged in the lateral direction (e.g., the X-axis direction of the position coordinates) of the sensor substrate 101. The Y-axis direction loop coil group 103Y includes m loop coils $103Y_1$ to $103Y_m$ (m is an integer of 2 or more) arranged in the longitudinal direction (e.g., the Y-axis direction of the position coordinates) of the sensor substrate 101.

The position detection sensor 100 is connected to the position detection circuit 200. In the example of FIG. 7, the position detection circuit 200 includes a selection circuit 201, an oscillator 202, a current driver 203, a transmission/reception switching circuit 204, a reception amplifier 205, a bandpass filter 206, which has a frequency f1 as a passing center frequency, a bandpass filter 207, which has a frequency f2 as a passing center frequency, a writing position detection circuit 208, an erasure position detection circuit 209, and a processing controller 210.

The selection circuit 201 sequentially selects one of the loop coils of the X-axis direction loop coil group 102X and the Y-axis direction loop coil group 103Y and causes the selected loop coil to transmit a signal to the written input cartridge 3 or the eraser function cartridge 4 of the knock-type electronic pen 1 and receive a signal fed back from the written input cartridge 3 or the eraser function cartridge 4.

The transmission/reception switching circuit 204, which is switched and controlled by the processing controller 210, is connected to the selection circuit 201. When the transmission/reception switching circuit 204 is connected to a transmission-side terminal T, an alternating-current signal is supplied from the oscillator 202 to the selection circuit 201. When the transmission/reception switching circuit 204 is connected to a reception-side terminal R, a signal from the selection circuit 201 is supplied to the bandpass filters 206 and 207 through the reception amplifier 205.

The bandpass filter 206 extracts only a feedback signal from the resonant circuit 3RC of the written input cartridge 3 and supplies the feedback signal to the writing position detection circuit 208. The bandpass filter 207 extracts only a feedback signal from the resonant circuit 4RC of the eraser function cartridge 4 and supplies the feedback signal to the erasure position detection circuit 209.

Each of the writing position detection circuit 208 and the erasure position detection circuit 209 detects an induction voltage generated in the loop coil of the position detection sensor 100, that is, detects a received signal, converts the detected output signal into a digital signal, and outputs the digital signal to the processing controller 210.

The processing controller 210 calculates, as a written input position, an X coordinate value and a Y coordinate value of the position indicated by the pen tip of the written input cartridge 3 on the basis of digital signals from the writing position detection circuit 208, that is, the levels of voltage values of induction voltages generated in the individual loop coils. Further, the processing controller 210 calculates, as an erasure position, an X coordinate value and a Y coordinate value of the position indicated by the pen tip of the eraser function cartridge 4 on the basis of digital signals from the erasure position detection circuit 209, that is, the levels of voltage values of induction voltages generated in the individual loop coils.

[Effects of Knock-Type Electronic Pen According to Embodiment]

As described above, in the knock-type electronic pen according to the embodiment described above, even when the pen tip of the written input cartridge 3 is caused to protrude from the opening 2b on the pen tip side of the pen casing 2 by the knock cam mechanism 5 in response to the knock operation on the knock portion 52KN, the knock portion 52KN is held in the state of protruding from the opening 2c at the rear end of the pen casing 2 by the holding mechanism 6, and this holding state is maintained as long as the predetermined pressing force against the elastic force of the coil spring 46, which functions as the shock absorber that protects the eraser function cartridge 4, is not applied to the knock portion 52KN.

With this configuration, the user who has been writing with the pen tip of the written input cartridge 3 can hold the pen casing 2 upside down in order to correct the writing that has been input, bring the knock portion 52KN side protruding from the opening 2c close to the position detection sensor 100, and stably perform an erasure indication operation at a normal pen pressure.

In the present embodiment, even in a state in which the written input cartridge 3 including the pen tip is housed in the hollow portion 2a of the pen casing 2, the knock portion 52KN is held in the state of protruding from the opening 2c at the rear end of the pen casing 2, and this holding state is maintained as long as the predetermined pressing force against the elastic force of the coil spring 46, which functions as the shock absorber that protects the eraser function cartridge 4, is not applied to the knock portion 52KN.

Therefore, even in a state in which the written input cartridge 3 including the pen tip does not protrude from the opening 2b on the pen tip side of the pen casing 2, the user can bring the knock portion 52KN side protruding from the opening 2c at the rear end of the pen casing 2 close to the position detection sensor 100 and stably give an erasure indication with a normal pen pressure.

Other Embodiments or Modifications

In the above-described embodiment, each of the first position indicator and the second position indicator has an electronic pen cartridge configuration. However, it is not necessary to have such a cartridge configuration. As long as the knock cam mechanism can alternately produce a state in which the pen tip protrudes from the opening of the pen casing and a state in which the pen tip is housed in the hollow portion of the pen casing, the first position indicator and the second position indicator may have any other configuration.

Further, in the above-described embodiment, the holding mechanism has a configuration in which the knock cam mechanism is applied. However, as long as the knock portion can be held in a state of protruding from the opening at the rear end of the pen casing at all times, the holding mechanism may have any other configuration.

Further, in the above-described embodiment, the first position indicator is used for written input, and the second position indicator is used for erasing information written by the first position indicator. However, the present disclosure is not limited to this example. For example, the first position indicator may be configured by a position indicator of a capacitance type, the second position indicator may be configured by a position indicator of an electromagnetic induction type, and both the position indicators may serve as position indicators of different types and may be used for written input. In this case, the knock portion in which the pen tip of the second position indicator is housed can be removed from the rotor drive portion of the knock cam mechanism, and the pen tip side of the second position indicator may be externally exposed and protrude from the opening at the rear end of the pen casing.

It is to be noted that the embodiment of the present disclosure is not limited to the foregoing embodiment, and that various changes can be made without departing from the principles set forth in the present disclosure.

The invention claimed is:

1. A knock-type electronic pen comprising:
   a tubular casing;
   a first position indicator disposed such that a tip of the first position indicator for position indication is located on a side of an opening at a first end in an axial direction of the tubular casing;
   a second position indicator disposed such that a tip of the second position indicator for position indication is located on a side of an opening at a second end in the axial direction of the tubular casing;
   a knock cam mechanism which includes a knock portion including a part protruding outward from the opening at the second end in the axial direction of the tubular casing and which alternately produces, in response to a knock operation on the knock portion, a state in which at least a core rod body at the tip of the first position indicator protrudes from the opening at the first end of the tubular casing and a state in which the first position indicator including the tip of the first position indicator is housed in the tubular casing,
   wherein the second position indicator is housed in the knock cam mechanism such that at least a core rod body at the tip of the second position indicator is housed in the part of the knock portion protruding outward from the opening at the second end of the tubular casing; and
   a holding mechanism which, in the state in which at least the core rod body of the first position indicator protrudes from the opening at the first end of the tubular casing by the knock operation on the knock portion, returns the knock portion pushed into the tubular casing by the knock operation to a state of protruding outward from the opening at the second end in the axial direction of the tubular casing and holds the knock portion in the protruding state,
   wherein the holding mechanism includes another knock cam mechanism which is different from the knock cam mechanism and which operates in response to the knock operation on the knock portion.

2. The knock-type electronic pen according to claim 1, wherein,
   when a pressing force at a time of the knock operation on the knock portion is equal to or less than a predetermined value, the holding mechanism holds the knock portion such that the knock portion protrudes outward from the opening at the second end in the axial direction of the tubular casing, and
   when the pressing force at the time of the knock operation on the knock portion exceeds the predetermined value, the holding mechanism releases the holding of the knock portion to allow an operation of the knock cam mechanism to start.

3. The knock-type electronic pen according to claim 1, wherein, even in the state in which the first position indicator including the tip of the first position indicator is housed in the tubular casing, the holding mechanism holds the knock portion of the knock cam mechanism such that the knock portion protrudes outward from the opening at the second end in the axial direction of the tubular casing.

4. The knock-type electronic pen according to claim 1, wherein
   the knock cam mechanism includes:
      a rotor to which a rear end of the first position indicator opposite to the tip of the first position indicator is fitted, and
      a rotor drive portion which moves in the axial direction in response to the knock operation on the knock portion and rotates the rotor in response to the knock operation, wherein
   the second position indicator is disposed in a hollow portion in an axial direction of the rotor drive portion, and
   the holding mechanism includes an urging member elastically urging the rotor drive portion toward the second end in the axial direction of the tubular casing.

5. The knock-type electronic pen according to claim 4, wherein, in the hollow portion of the rotor drive portion, the second position indicator is elastically urged toward the second end in the axial direction of the tubular casing by an elastic member.

6. The knock-type electronic pen according to claim 5, wherein
   the rotor drive portion includes a first portion and a second portion coupled to each other in the axial direction in a state in which the rotor drive portion is movable in the axial direction against an urging force of the elastic member,
   the hollow portion of the rotor drive portion is formed by a hollow portion communicating between the first portion and the second portion coupled to each other in the axial direction,
   an end in the axial direction of the first portion opposite to a side where the first portion is coupled to the second portion is engaged with the rotor and rotates the rotor, while an end in the axial direction of the second portion opposite to a side where the second portion is coupled to the first portion serves as the knock portion protruding outward from the opening at the second end in the axial direction of the tubular casing,
   when a pressing force at a time of the knock operation on the knock portion is equal to or less than an elastic force of the elastic member, the holding mechanism holds the knock portion such that the knock portion protrudes outward from the opening at the second end in the axial direction of the tubular casing, and
   when the pressing force at the time of the knock operation on the knock portion exceeds the elastic force of the elastic member, the holding mechanism releases the holding of the knock portion to allow an operation of the knock cam mechanism to start.

7. The knock-type electronic pen according to claim 6, wherein
   a rotor of the another knock cam mechanism is disposed in such a manner as to be slidable on an outer circumferential side of the first portion and is engaged with an edge of the second portion on the side where the second portion is coupled to the first portion, and is caused to rotate by receiving the pressing force in the axial direction in response to the knock operation on the knock portion of the second portion, when the pressing force at the time of the knock operation on the knock portion is equal to or less than the elastic force of the elastic member, the rotor of the another knock cam mechanism holds the knock portion, which is prevented from moving in the axial direction, such that the knock portion protrudes outward from the opening at the second end in the axial direction of the tubular casing, and when the pressing force at the time of the knock operation on the knock portion exceeds the elastic force of the elastic member, the rotor of the another knock cam mechanism rotates and stops preventing the knock portion from moving in the axial direction to allow the operation of the knock cam mechanism to start.

8. The knock-type electronic pen according to claim 7, wherein the urging member elastically urges the rotor drive portion toward the second end in the axial direction of the tubular casing via the rotor of the another knock cam mechanism.

9. The knock-type electronic pen according to claim 7, wherein the rotor of the another knock cam mechanism includes a plurality of first protrusions disposed at predetermined intervals in a circumferential direction, a plurality of second protrusions are formed in a circumferential direction of an inner wall surface of the tubular casing and are engaged with the plurality of first protrusions of the rotor of the another knock cam mechanism, when the pressing force at the time of the knock operation on the knock portion is equal to or less than the elastic force of the elastic member, the plurality of first protrusions of the rotor of the another knock cam mechanism abut against the plurality of second protrusions on the inner wall surface of the tubular casing and hold the knock portion such that the knock portion protrudes outward from the opening at the second end in the axial direction of the tubular casing, and when the pressing force at the time of the knock operation on the knock portion exceeds the elastic force of the elastic member, the rotor of the another knock cam mechanism is caused to rotate to cause the plurality of first protrusions of the rotor of the another knock cam mechanism and the plurality of second protrusions on the inner wall surface of the tubular casing not to abut against each other to release the holding of the knock portion, and the rotor drive portion moves toward the opening at the first end of the tubular casing, together with the rotor of the another knock cam mechanism.

10. The knock-type electronic pen according to claim 9, wherein the urging member is disposed between the plurality of second protrusions of the tubular casing and the rotor of the another knock cam mechanism.

11. The knock-type electronic pen according to claim 1, wherein each of the first position indicator and the second position indicator has an electronic pen cartridge configuration.

12. The knock-type electronic pen according to claim 1, wherein each of the first position indicator and the second position indicator is a position indicator of an electromagnetic induction type.

13. The knock-type electronic pen according to claim 1, wherein the first position indicator and the second position indicator are different from each other in any of a frequency, a signal pattern, and a modulation method of a signal for interacting with a position detection sensor.

14. The knock-type electronic pen according to claim 1, wherein an eraser or a pseudo eraser is attached to a tip of the part of the knock portion protruding outward from the opening at the second end in the axial direction of the tubular casing.

15. The knock-type electronic pen according to claim 1, wherein the first position indicator is a position indicator of a capacitance type, while the second position indicator is a position indicator of an electromagnetic induction type.

* * * * *